United States Patent
Cramer et al.

(10) Patent No.: US 7,054,919 B2
(45) Date of Patent: May 30, 2006

(54) SYSTEM AND METHOD FOR PROVIDING VIRTUAL ONLINE ENGINEERING OF A PRODUCTION ENVIRONMENT

(75) Inventors: Spencer Cramer, Nyack, NY (US); Brett Smith, New York, NY (US)

(73) Assignee: ei3 Corporation, Montvale, NJ (US)

( * ) Notice: Subject to any disclaimer, the term of this patent is extended or adjusted under 35 U.S.C. 154(b) by 848 days.

(21) Appl. No.: 09/882,739

(22) Filed: Jun. 15, 2001

(65) Prior Publication Data
US 2002/0194304 A1 Dec. 19, 2002

(51) Int. Cl.
*G06F 15/16* (2006.01)
(52) U.S. Cl. .................. 709/218; 709/231; 709/247
(58) Field of Classification Search ........ 709/217–219, 709/224, 231, 247
See application file for complete search history.

(56) References Cited

U.S. PATENT DOCUMENTS

| | | | |
|---|---|---|---|
| 4,125,892 A * | 11/1978 | Fukuda et al. ............... | 709/224 |
| 4,996,655 A | 2/1991 | Chadwick et al. | |
| 5,084,875 A | 1/1992 | Weinberger et al. | |
| 5,586,056 A | 12/1996 | Watanbe | |
| 5,631,839 A | 5/1997 | Lemoine | |
| 5,668,741 A | 9/1997 | Prigent | |
| 5,805,442 A | 9/1998 | Crater et al. | |
| 5,946,309 A * | 8/1999 | Westberg et al. ........ | 370/395.3 |
| 5,995,916 A | 11/1999 | Nixon et al. | |
| 6,014,612 A | 1/2000 | Larson et al. | |

(Continued)

OTHER PUBLICATIONS

John Enck, Symantec's pcANYWHERE32, Windows IT Pro, May 1996.
SIMATIC S5 Teleservice TS 758 H Hoperating Instructions, edition 04.88.
SIMATIC S7 Software PRODAVE MPI Manual 1999.

(Continued)

*Primary Examiner*—Jason Cardone
*Assistant Examiner*—Thomas Duong
(74) *Attorney, Agent, or Firm*—Amster, Rothstein & Ebenstein LLP

(57) ABSTRACT

A system and method of provide real-time monitoring and control of a production environment. Manufacturing equipment having proprietary or non-standard digital interfaces provide a plurality of data streams having incompatible communication protocols that are converted to a common communication protocol by a translator and aggregated on a local area network. The resulting aggregated data stream is transmitted across an open network such as the internet or via a wide area network to a remote network. Virtual remote engineering of the production environment is possible from the remote network through monitoring, analysis and control of the production environment.

4 Claims, 1 Drawing Sheet

U.S. PATENT DOCUMENTS

| | | | |
|---|---|---|---|
| 6,108,615 A | 8/2000 | Fuhring et al. | |
| 6,115,643 A | 9/2000 | Stine et al. | |
| 6,161,193 A | 12/2000 | Garg et al. | |
| 6,308,205 B1* | 10/2001 | Carcerano et al. | 709/221 |
| 6,343,321 B1* | 1/2002 | Patki et al. | 709/227 |
| 6,437,692 B1* | 8/2002 | Petite et al. | 340/540 |
| 6,539,422 B1* | 3/2003 | Hunt et al. | 709/217 |
| 6,654,373 B1* | 11/2003 | Maher et al. | 370/392 |
| 6,697,871 B1* | 2/2004 | Hansen | 709/234 |
| 6,714,976 B1* | 3/2004 | Wilson et al. | 709/224 |
| 6,901,052 B1* | 5/2005 | Buskirk et al. | 370/235 |

OTHER PUBLICATIONS

Ken Goldberg, Michael Mascha, Steve Genter, Nick Rothenberg, Carl Sutter and Jeff Wiegley, Desktop Teleoperation via the World Wide Web, 1994.

F. Momal, C. Pinto-Pereira, Using World-Wide Web for Control System, 1995.

Tristan Richardson, Quentin Stafford-Fraser, Kenneth R. Wood and Andy Hopper, Virtual Network Computing, IEEE Internet Computing, vol. 2, No. 1, Jan./Feb. 1998.

* cited by examiner

SYSTEM AND METHOD FOR PROVIDING VIRTUAL ONLINE ENGINEERING OF A PRODUCTION ENVIRONMENT

BACKGROUND OF THE INVENTION

The invention described herein relates generally to a system and method for remotely managing a production environment. Specifically, the invention aggregates digital data sources originating from computer controlled production machinery into a single bidirectional data link to a centralized remote site where data can be stored and analyzed and from which control, modification and maintenance of the production machinery can be effected.

In a typical production environment, a diverse assortment of automated machinery is used to produce finished products from raw materials. Although older machines may still have analog or mechanical systems to regulate their operation, newer production machines are generally digitally controlled and use microprocessors to keep them operating within desired parameters. In general, each digitally controlled machine is provided with its own microprocessor in a "control unit" that is connected to a plurality of sensors and/or actuators strategically located on the machine. These sensors and actuators are well known in the art and are specifically tailored to monitor and control one or more operating parameters such as temperature, pressure, humidity, viscosity, spindle speed, etc. that are critical to a specific machine.

The control unit of a production machine generally has a terminal or control panel to allow human machine operators and engineers to interface with the control unit, and thus to monitor and control the operation of the production machine. In cases where the control unit provides information to a human operator in real time, the operator can react to changes in production or machine status based on information provided by the control unit. For example, in response to an alarm received from a control unit due to an overheated bearing, an operator may adjust the operating speed of the equipment to prevent damage to the bearing. In cases where machine speed is also regulated by the control unit, the human operator can monitor bearing temperature and control the machine speed from a single terminal connected to the control unit. In some cases, configurable software running on the control units microprocessor may enable the control unit to make routine adjustments to a particular production unit automatically without the intervention of a human operator. When it is necessary, configuration of the software on the control unit's microprocessor is again typically accomplished from a control panel on the control unit itself, or from a terminal connected to the control unit.

Therefore, it can be seen that the control units typically provided on production equipment enable operational communication that is both bidirectional and takes place on two hierarchical levels. At a first hierarchical level, a human operator receives machine status information and transmits commands to the machine via the machine's control unit. This is operational communication, and commonly takes place during the ordinary course of production. However, in the event that modification or configuration of the software of the control unit is required, an engineer interfaces directly with the control unit to read and/or modify the software that dictates the manner in which the control unit carries out its function. This is configurational communication, which may be said to belong to a second hierarchical level associated with modifying the production environment itself. Having the ability to monitor an entire production environment in real-time and to undertake both operational and configurational communication of all of the machines in a production environment is necessary to the comprehensive management, or process engineering, of the production environment.

It is common in production environments for machines of different types to be used during each step of production. Although each type of machine that has a digital interface functions generally as described above, the control unit on each machine is specialized to provide diagnostic information and permit control of parameters that are relevant to that machine's specific function. Therefore, the data acquired by one control unit is likely to be different in content both operationally and configurationally from that acquired by another. Furthermore, because machines of various ages, origins and levels of sophistication may be used in a single production environment, the Input/Output (I/O) protocol used by each machine's control unit is likely to be proprietary, or otherwise incompatible with the control units of other machines. Finally, the operating system and software of the control units may differ from each other. Thus, the diversity of machinery in a typical production environment often results in a corresponding diversity of data formats, programming languages and communications protocols creating a production data topology in which each machine is isolated and depends upon the intervention of a human operator to coordinate its operation with the other machines in the production environment. This complicates the aggregation of data, and makes analysis thereof in real-time difficult.

It is known to monitor the fundamental elements of a manufacturing process through the use of sensors to measure critical aspects in the transformation of a raw material into a finished product. U.S. Pat. No. 5,668,741 to Prigent entitled "Process and Device to Continuously and in Real Time Control a Complex Manufacturing Process" discloses the monitoring of a manufacturing process wherein a plurality of sensors are deployed along a production line and connected to a computer over a network. Each sensor is provided with its own network interface circuit to convert analog sensor data into a digital signal compatible with the network. Sensor data routed to the computer may be stored on a database or analyzed in real time.

Such a system, however, is designed strictly for monitoring a process, not for the comprehensive process engineering discussed above. Therefore, in the event that analysis of the sensor output by Prigent reveals a problem, corrective modifications to the production environment must be undertaken manually or through a separate system. Furthermore, because this system requires the installation of sensors that are at once compatible with the machinery they are connected to and also compatible with the other sensors on the network, it can be difficult or expensive to install in an existing production environment. A further drawback, is that installing such specialized sensors on modern equipment may actually be redundant to the sensing and feedback systems already in place on digitally controlled production equipment.

Additionally, the control units on production equipment tend to be located in close physical proximity to the controlled machines, and thus require human operators on the production floor to perform the tasks associated with process engineering. Systems have been designed to permit the control units to be monitored remotely, such as from a single remote control center. For example, U.S. Pat. No. 4,996,655 to Chadwick et al. entitled "Real Time Monitoring of Remote Signals in an Industrial Environment" discloses a device that allows for a unidirectional connection over a data line between a control unit associated with a piece of production equipment, and a computer displaying data from the control unit located up to 500 meters away. Such a system must be specially configured to each control unit, does not aggregate the data of more than one control unit, and does not permit bi-directional communication. Therefore, real-time monitoring of more than one device is not possible without running additional data lines, making a large-scale deployment unwieldy and inflexible, especially in the event that production facilities are spread out over several remote locations. Moreover, because communication is only one-way, the system cannot pass instructions back to the control unit and thus will not allow control of the machine, or modification of the control unit's parameters from the remote location.

Therefore, a need exists for a system to enable process engineering from a centralized location remote from the production site by allowing for the migration of manufacturing data from a plurality of existing control units connected to production machinery.

A further need exists for a system allowing communication with a diverse plurality of control units associated with production machinery in a production environment over a single bidirectional data stream utilizing a standard network communications protocol without the need for the installation of specialized or redundant sensors.

A still further need exists for a system to permit control of the operating parameters of the machines in a production environment from a centralized location. Additionally, such a system should allow for reconfiguration of the microprocessor-based control units from the remote location, thereby permitting virtual process engineering of the production environment.

A still further need exists for a system that is capable of storing and analyzing data aggregated from a plurality of production equipment control units and from multiple production facilities in a centralized location to provide real-time notification of changes in the production line, predictions of likely component failures and root cause analysis of production line failures.

SUMMARY OF THE INVENTION

According to an aspect of the present invention, a system for providing remote telemetry and analysis of data acquired from one or more production environments includes a system for converting in real-time the output of a plurality of diverse control units connected to production machinery into a common protocol suitable for bidirectional transmission as an aggregate data stream to a remote location for monitoring and analysis.

According to another aspect of the present invention, constant collection at the remote location of key data acquired from a production environment enables analysis and accurate reporting of the root cause of equipment problems, even those causes that may be the result of failures or problems in production units elsewhere within the environment.

According to another aspect of the present invention, operating instructions for execution by specific control units formulated at the remote monitoring site are transmitted back to the appropriate control units in the production environment, permitting operational communication between the machines in the production environment and the remote location to the same extent possible locally.

According to a further aspect of the present invention, configuration instructions for incorporation by specific control units formulated at the remote monitoring site are transmitted back to the appropriate control units in the production environment, allowing configurational communication between the production environment and the remote location to the same extent possible locally.

According to another aspect of the present invention, operational and configurational communication between the production environment and the remote location is possible simultaneously in real-time, allowing virtual process engineering of the production environment from the remote site.

In accordance with a preferred embodiment of the present invention, the production machines in a production environment are linked together across a computer network. If needed, a translation device is provided to convert the I/O of proprietary control units in the production environment into a common network protocol. The data provided by the control units is aggregated on a local area network (LAN) at the production environment and transmitted by a router over a wide area network (WAN) or an open network such as the internet to a centralized monitoring location remote from the production environment. The remote location functions as a control center where the aggregated data is parsed and processed, delivering the status of each machine in the production environment to the remote location in real time. The aggregated data is simultaneously stored in a database for analysis, and is available to additional control centers or monitoring locations over a WAN or an open network.

In accordance with another preferred embodiment of the present invention, control data such as operational instructions and configuration data originating at a monitoring location is transmitted over a WAN or an open network such as the internet to a router connected to a LAN at a monitored location having at least one unit of production machinery with a control unit connected by a BLACK BOX to the LAN. The control data is routed across the LAN to the proper control unit which executes the instructions or configures itself accordingly.

DETAILED DESCRIPTION OF THE INVENTION

Figure 1:
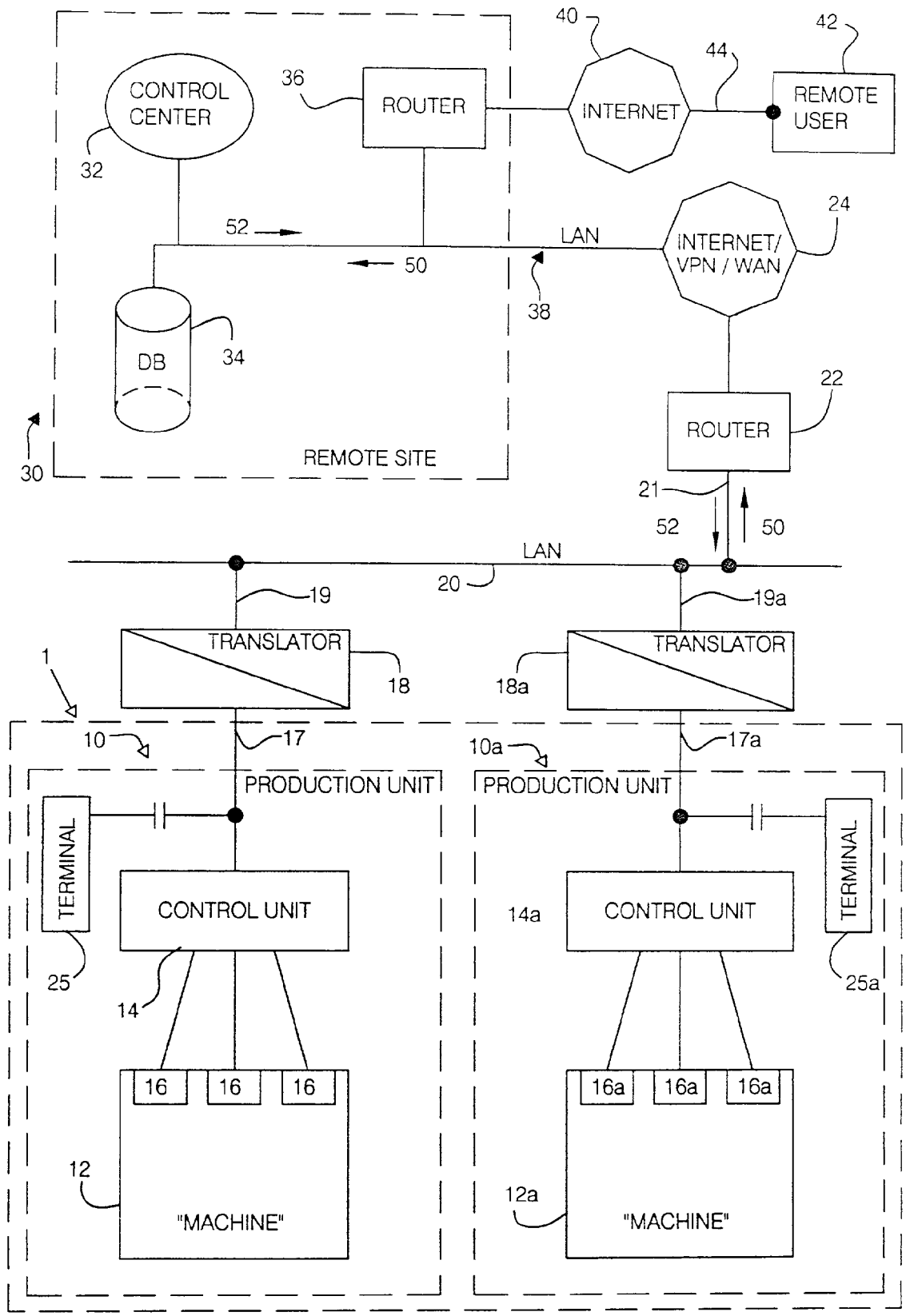
FIG. 1 a block diagram of an embodiment of the present invention wherein the data aggregated from a plurality of production machines is transmitted to a remote location over an open network such as the internet.

Referring to FIG. 1, manufacturing environment 1, such as a factory, is shown having a plurality of digitally interfaced production units 10, 10a. Each production unit has a machine 12, 12a, a control unit 14, 14a connected to a plurality of interface devices 16, 16a and a terminal 25, 25a.

Machines 12, 12a are devices or pieces of equipment used for a specific task in the production of a finished product such as a milling machine, printing press, oven, conveyor belt, etc. As in an ordinary manufacturing environment, a diverse assortment of machines is used during production, and so each machine 12, 12a, etc. may have different configurations and functions from one another.

Each machine 12, 12a has at least one interface device 16, 16a coupled to it. These interface devices are typically analog sensors such as thermocouples or strain gauges, or actuators such as relays or servo-mechanisms. The interface devices are deployed on the respective machines 12, 12a based on the function of the machine and its critical components as, for example, to measure the temperature of a bearing or to control the speed of a drive motor. The interface devices of each machine are connected to control units 14, 14a which are microprocessor controlled and communicate through digital lines 17, 17a, respectively.

During operation of production units 10, 10a, machines 12, 12a are monitored and controlled by individual control units 14, 14a. Sensor output is converted to digital form and transmitted as operational data to one or more human operators connected to lines 17, 17a via terminals 25, 25a. Thus, operators are able to locally monitor the sensor readings, and control the operation of the machines as needed. Additionally, control units 14, 14a may be provided with software enabling production units 10, 10a to have limited automatic functionality, while still providing operational data through lines 17, 17a. In such control units, configuration of the software may also be carried out from terminals 25, 25a thereby permitting configurational control of the production unit from the same terminals that allow operational control.

Typically, machines 12, 12a are highly specialized, requiring a control unit specifically tailored to the structure and function of the machine. Therefore, the microprocessors of control units 14, 14a are often designed to operate on a proprietary operating system, and to provide output through lines 17, 17a in a non-standard, proprietary or obsolete format or protocol. In a diverse manufacturing environment, line 17 may conform to the RS-232 protocol, while 17a may employ a different, proprietary protocol unique to control unit 14a. Although actual manufacturing environments may have a different configuration, this description encompasses the basic configuration of existing digitally interfaced production devices for purposes of the present invention.

The invention comprises connecting lines 17, 17a to translation devices 18, 18a respectively. The translation devices 18, 18a have output 19, 19a connected to local area network (LAN) 20 which is connected through line 21 carrying data stream 50 through router 22 to a network 24 such as the internet, a virtual private network (VPN) or a wide area network (WAN) that is connected to remote monitoring site 30.

During operation, data output from lines 17, 17a is transmitted to translation devices 18, 18a respectively. The translation devices are configured to translate the I/O protocol of control units 14, 14a to a standard protocol such as TCP/IP. Configurable protocol converters are commonly available, for example from Black Box Corporation, and are suitable for use as translation devices 18, 18a. The output 19 of translation devices 18 and 18a are broadcast over LAN 20. Although both streams of data from production unit 10 and 10a are transmitted over the same network, the data, thus aggregated into data stream 50 remains, in the case of TCP/IP, identifiably packetized and can be parsed into separate data upon arrival over network 24 to remote monitoring site 30.

Remote monitoring site 30 comprises a control center 32, a database 34 and a router 36 all connected to LAN backbone 38. Router 36 is connected to open network 40, such as the internet to which remote terminal 42 may be connected through connection 44, as over a telephone line.

During operation, remote monitoring site 30 receives aggregated data stream 50 from production environment 1. Real-time data for each production unit 10, 10a is parsed and monitored by human operators or monitoring software in control center 32. The control center 32 may be provided with a number of commonly available display screens and computer terminals for this purpose (not shown). The contents of data stream 50 are stored in database 34 to assist in statistical analysis such as failure prediction and root cause analysis. Database 34 may be any conventional database such as SQL or Oracle, configured to correspond with the volume of data 50 expected from manufacturing environment 1. Mobile access to remote monitoring site 30 may also take place from terminal 42 through open network 40.

Whereas the invention thus far has been described as a system and method for providing remote telemetry to monitor and analyze production environment 1, it will be recognized that data stream 52, originating at remote monitoring site 30 may contain both operational and configurational communication and may be transmitted in identifiably packetized form to specific production units 10 or 10a using the same protocol used to transmit data stream 50. In this case the system employs the above-described method in reverse.

Operational and configurational communication in the form of data representing instructions to specific target production units 10, 10a is generated at control center 32 and combined or encoded into a single data stream 52. The communication is either generated by human operators working from terminals in control center 32, or may be generated automatically in response to analysis of data stored in database 34. Data stream 52 is broadcast over LAN 38 concurrently with incoming data stream 50 to the open network 24. Data stream 52 is transmitted to router 22 from which it is broadcast over LAN 20. The packetized data is then distributed to the appropriate translator 18 or 18a which translates the decoded data for input to production unit 10 or 10a.

To the extent that interfaces 16 permit actuation, or modification of the parameters of machines 12, 12a or configuration of control units 14, 14a, the simultaneous exchange of data streams 50 and 52 permit control of each production unit, essentially replacing terminals 25, 25a. The aggregation of bidirectional data communication from a potentially diverse set of production units 10, 10a, etc. and transmission thereof to remote site 30 enables global monitoring, control, analysis and therefore remote virtual engineering of the production environment 1. Subsequent transmission of data via router 36 over open network 40 further enables remote access to the remote site 30 and thus communication with the production environment 1.

While the invention has been described with reference to various embodiments, it will be understood that these embodiments are illustrative and that the scope of the invention is not limited to them. Many variations, modifications, additions and improvements of the embodiments described are possible.

What is claimed is:

1. A method for providing remote engineering for an industrial environment, said industrial environment having a plurality of production devices each with at least one digital control unit connected thereto and employing one or more of a diverse plurality of communication protocols to provide a discreet communication channel providing input of instructions and output of data for each production device, comprising the steps of:
   translating the output of said digital control units into a plurality of discrete data streams having a common communication protocol;
   reversibly encoding said plurality of discrete data streams into a first single data stream using said common communication protocol;
   transmitting said first single data stream to a remote network;

decoding said first single data stream at the remote network into said discrete data streams, wherein each said discrete data stream is in a format particular to an individual production device;

identifying by analysis of said data at the remote network at least one target production device of said plurality of production devices to receive instructions for remote engineering;

formulating a plurality of instructions responsive to said analysis and arranged as a discrete remote engineering instruction set corresponding to each of said at least one target production device, each of said discrete remote engineering instruction sets comprising configurational and operational data relating to a corresponding one of said at least one target production device;

reversibly encoding said remote engineering instruction sets into a second single data stream using said common communication protocol;

transmitting said second single data stream to said industrial environment;

decoding said second single data stream at the local network into said discrete remote engineering instruction set;

translating said remote engineering instruction set into at least one of said diverse communication protocols executable by the digital control unit connected to each of said at least one target production unit; and delivering said remote engineering instruction set over the local network to the target production unit.

2. The method of claim 1 wherein said first single data stream and said second single data stream are transmitted across a single bidirectional communication line.

3. A method for providing remote telemetry for an industrial environment having a plurality of production devices with digital control units employing one or more of a diverse plurality of communication protocols to provide discreet data streams comprising the steps of:

translating the output of said digital control units into a plurality of discrete data streams having a common communication protocol;

reversibly encoding said plurality of discrete data streams into a single data stream using said common communication protocol;

transmitting said data stream over an open network to a remote network in real time;

decoding said single data stream into said discrete data streams at said remote network, wherein each said discrete data stream is in a format particular to an individual production device;

identifying by analysis of said data at the remote network at least one target production device of said plurality of production devices to receive instructions for remote engineering; and formulating a plurality of instructions responsive to said analysis and arranged as a discrete remote engineering instruction set corresponding to each of said at least one target production device, each of said discrete remote engineering instruction sets comprising configurational and operational data relating to a corresponding one of said at least one target production device.

4. In production environment having a plurality of production devices with digital control units connected by at least one interface thereto and employing one or more of a diverse plurality of communication protocols to provide a discrete data stream, a system for providing process engineering from a remote data network comprising:

an open network connected to said remote data network and enabling data communication therebetween;

at least one translator connected to each of said plurality of control units to allow conversion of data between said diverse plurality of communication protocols and a common communication protocol;

a data network local to said production environment and using said common communication protocol for connecting said at least one translator to said open network and allowing data communication therethrough with said remote data network;

an encoder at said local network that reversibly encodes said plurality of discrete data streams into a single data stream using said common communication protocol;

a decoder at said remote network that decodes said single data stream into said plurality of discrete data streams, wherein each said discrete data stream is in a format particular to an individual production device; and a remote network that identifies by analysis of said data at the remote network at least one target production device of said plurality of production devices to receive instructions for remote engineering and that formulates a plurality of instructions responsive to said analysis and arranged as a discrete remote engineering instruction set corresponding to each of said at least one target production device, each of said discrete remote engineering instruction sets comprising configurational and operational data relating to a corresponding one of said at least one target production device.

* * * * *